United States Patent
Norrie et al.

(10) Patent No.: US 11,934,826 B2
(45) Date of Patent: *Mar. 19, 2024

(54) VECTOR REDUCTIONS USING SHARED SCRATCHPAD MEMORY

(71) Applicant: Google LLC, Mountain View, CA (US)

(72) Inventors: Thomas Norrie, Mountain View, CA (US); Gurushankar Rajamani, Sunnyvale, CA (US); Andrew Everett Phelps, Middleton, WI (US); Matthew Leever Hedlund, Madison, WI (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,869

(22) Filed: Nov. 19, 2021

(65) Prior Publication Data

US 2022/0156071 A1 May 19, 2022

Related U.S. Application Data

(63) Continuation of application No. 17/007,569, filed on Aug. 31, 2020, now Pat. No. 11,182,159.

(Continued)

(51) Int. Cl.
*G06F 9/30* (2018.01)
*G06F 13/28* (2006.01)
(Continued)

(52) U.S. Cl.
CPC ........ *G06F 9/30036* (2013.01); *G06F 9/3001* (2013.01); *G06F 9/3004* (2013.01);
(Continued)

(58) Field of Classification Search
CPC ................ G06F 9/30036; G06F 15/7821
See application file for complete search history.

(56) References Cited

U.S. PATENT DOCUMENTS

| 5,990,904 A | 11/1999 | Griffin |
| 6,005,583 A | 12/1999 | Gabriel et al. |

(Continued)

FOREIGN PATENT DOCUMENTS

| CN | 104699631 A | 6/2015 |
| CN | 107003988 A | 8/2017 |

(Continued)

OTHER PUBLICATIONS

S. Ahn, J. Kim, E. Lim and S. Kang, "Soft Memory Box: A Virtual Shared Memory Framework for Fast Deep Neural Network Training in Distributed High Performance Computing," in IEEE Access, vol. 6, pp. 26493-26504, 2018 (Year: 2018).*

(Continued)

*Primary Examiner* — Michael J Metzger
(74) *Attorney, Agent, or Firm* — Fish & Richardson P.C.

(57) ABSTRACT

Methods, systems, and apparatus, including computer-readable media, are described for performing vector reductions using a shared scratchpad memory of a hardware circuit having processor cores that communicate with the shared memory. For each of the processor cores, a respective vector of values is generated based on computations performed at the processor core. The shared memory receives the respective vectors of values from respective resources of the processor cores using a direct memory access (DMA) data path of the shared memory. The shared memory performs an accumulation operation on the respective vectors of values using an operator unit coupled to the shared memory. The operator unit is configured to accumulate values based on arithmetic operations encoded at the operator unit. A result (Continued)

vector is generated based on performing the accumulation operation using the respective vectors of values.

8 Claims, 6 Drawing Sheets

Related U.S. Application Data

(60) Provisional application No. 62/981,957, filed on Feb. 26, 2020.

(51) Int. Cl.
*G06F 15/78* (2006.01)
*G06N 3/045* (2023.01)

(52) U.S. Cl.
CPC .......... *G06F 13/28* (2013.01); *G06F 15/7821* (2013.01); *G06N 3/045* (2023.01)

(56) References Cited

U.S. PATENT DOCUMENTS

| | | | |
|---|---|---|---|
| 8,289,335 | B2 | 10/2012 | Hansen et al. |
| 9,639,367 | B2 | 5/2017 | Hakura et al. |
| 9,798,519 | B2 | 10/2017 | Elmer |
| 10,354,733 | B1 | 7/2019 | Zejda et al. |
| 10,380,064 | B2 | 8/2019 | Henry et al. |
| 10,460,416 | B1 | 10/2019 | Sirasao et al. |
| 2013/0332797 | A1 | 12/2013 | Chung |
| 2016/0098200 | A1* | 4/2016 | Guz .................. G06F 11/30 711/154 |
| 2016/0196856 | A1 | 7/2016 | Tiwari et al. |
| 2017/0255571 | A1 | 9/2017 | Dupont De Dinechin et al. |
| 2019/0065824 | A1 | 2/2019 | Gaudet et al. |
| 2019/0138893 | A1* | 5/2019 | Sharma ................ G11C 7/1039 |
| 2019/0179635 | A1 | 6/2019 | Jiao et al. |
| 2020/0293867 | A1 | 9/2020 | Shao et al. |

FOREIGN PATENT DOCUMENTS

| | | |
|---|---|---|
| CN | 108268422 A | 7/2018 |
| CN | 108874744 A | 11/2018 |
| TW | 201734758 | 10/2017 |
| TW | 202004656 | 1/2020 |
| WO | WO 2016/003740 | 1/2016 |

OTHER PUBLICATIONS

Ahn et al, "Scatter-Add in Data Parallel Architectures" Proceedings of the 11th Int'l Symposium on High-Performance Computer Architecture, 2005, 11 pages.

PCT International Search Report and Written Opinion in International Application No. PCT/US2020/062612, dated Mar. 19, 2021, 17 pages.

International Preliminary Report on Patentability in International Appln. No. PCT/US2020/062612, dated Sep. 9, 2022, 10 pages.

Office Action in Chinese Appln. No. 202080061241.0, dated Feb. 11, 2023, 11 pages (with English Translation).

Office Action in Taiwanese Appln. No. 109143078, dated Jan. 19, 2024, 8 pages (with English translation).

* cited by examiner

VECTOR REDUCTIONS USING SHARED SCRATCHPAD MEMORY

CROSS-REFERENCE TO RELATED APPLICATION

This application is a continuation of U.S. application Ser. No. 17/007,569, filed Aug. 31, 2020, which claims the benefit of U.S. Provisional Application No. 62/981,957, filed Feb. 26, 2020, the contents of which are incorporated by reference here.

BACKGROUND

This specification generally relates to circuitry for a hardware circuit used to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters. Some neural networks can be convolutional neural networks (CNNs) configured for image processing or recurrent neural networks (RNNs) configured for speech and language processing. Different types of neural network architectures can be used to perform a variety of tasks related to classification or pattern recognition, predictions that involve data modeling, and information clustering.

A neural network layer of a CNN can have an associated set of kernels, which may correspond to parameters or weights. The associated set of kernels are used to process inputs (e.g., a batch of inputs) through the neural network layer to generate a corresponding output of the layer for computing a neural network inference. A batch of inputs and set of kernels can be represented as a tensor, i.e., a multi-dimensional array, of inputs and weights. A hardware circuit that implements a neural network includes memory with locations that are identified by an address value. The memory locations can correspond to elements of a tensor and the tensor elements may be traversed or accessed using control logic of the circuit. For example, the control logic can determine or compute a memory address value of an element to load or store the corresponding data value of the element.

SUMMARY

This document describes techniques for performing data accumulations and vector reductions at a large shared scratchpad memory. In particular, the techniques are used to reduce an overall quantity of operations that are required to perform a vector reduction that involves reducing values or outputs generated as a result of computations that occur at respective processor cores of a computing system. For example, the system includes a hardware circuit that can have multiple processor cores along with an architecture that incorporates memory resources of a static random access memory (SRAM). The memory resources of the SRAM are allocated for sharing amongst multiple respective processor cores of the circuit.

Sets of computations that occur in the computing system can be distributed amongst respective cores of one or more hardware circuits to generate respective vectors of values. The shared memory receives the respective vectors of values from respective resources of the processor cores using a direct memory access (DMA) data path of the shared memory. The shared memory performs an accumulation operation on the respective vectors of values using an operator unit coupled to the shared memory. The operator unit is configured to accumulate values based on arithmetic operations encoded at the operator unit. A result vector is generated based on performing the accumulation operation using the respective vectors of values.

One aspect of the subject matter described in this specification can be embodied in a method performed using a hardware circuit having a shared memory and multiple processor cores that communicate with the shared memory. The method includes: generating a first vector of values based on computations performed at a first processor core; receiving, by the shared memory and using a direct memory access (DMA) data path of the shared memory, the first vector of values from the first processor core; and performing, at the shared memory, an accumulation operation between the first vector of values and a vector stored in the shared memory. The accumulation operation is performed using an operator unit that is: i) coupled to the shared memory, and ii) configured to accumulate multiple vectors. The method includes generating a result vector based on performing the accumulation operation using the first vector of values.

These and other implementations can each optionally include one or more of the following features. For example, in some implementations, the vector stored in the shared memory was received from a second processor core and the method includes: performing, by the first processor core, an accumulate-to-memory operation to accumulate respective values of the first vector of values at a memory location of the shared memory; and performing, by the second processor core, an accumulate-to-memory operation to accumulate respective values of a second vector of values at the memory location of the shared memory, wherein the second vector of values corresponds to the vector stored in the shared memory.

In some implementations, generating the result vector based on performing the accumulation operation includes: generating the result vector without the first processor core performing a step of pre-accumulating products that result from computations performed at the first processor core; and generating the result vector without the second processor core performing a step of pre-accumulating products that result from computations performed at the second processor core.

In some implementations, generating the result vector includes: generating a vector of accumulated values as a result of performing the accumulation operation on the first vector of values; applying an activation function to each value in the vector of accumulated values; and generating the result vector as a result of applying the activation function to each value in the vector of accumulated values. In some implementations, a respective resource of the first processor core is a first matrix computation unit and the method further includes: generating a first vector of accumulated values, corresponding to the first vector of values, based on matrix multiplies performed using the first matrix computation unit of the first processor core.

In some implementations, a respective resource of the second processor core is a second matrix computation unit and the method further includes: generating a second vector of accumulated values, corresponding to the second vector of values, based on matrix multiplies performed using the second matrix computation unit of the second processor core. The hardware circuit can be a hardware accelerator configured to implement a neural network having multiple neural network layers; and the method includes generating an output for a layer of the neural network based on the result vector.

The method can further include: generating the first vector of values based on computations performed at the first processor core; and generating the second vector of values based on computations performed at the second processor core. The computations performed at the first processor core and the computations performed at the second processor core may be part of a mathematical operation governed by a commutative property. In some implementations, the mathematical operation is: a floating-point multiplication operation; a floating-point addition operation; an integer addition operation; or a min-max operation. In some implementations, the mathematical operation includes a floating-point addition operation and an integer addition operation. The first processor core and second processor core can be the same processor core.

In some implementations, the shared memory is configured to function as a shared-global memory space including memory banks and registers that are shared between two or more processor cores of the hardware circuit.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by a data processing apparatus, cause the apparatus to perform the actions.

The subject matter described in this specification can be implemented in particular embodiments so as to realize one or more of the following advantages.

The techniques described in this document leverage the capabilities of a large shared scratchpad memory that supports a DMA mode which reduces incoming vector data into the shared memory location atomically, instead of simply overwriting the data. In some cases, the various techniques described in this specification can be extended to other memory types that exist across a system, including on-chip and off-chip memory.

An operator unit is coupled in close proximity to the shared memory to support a variety of arithmetic operations for accumulating vector values to a shared memory cell/location. The arithmetic operations can be based on any reduction operator, such as floating-point atomic addition, integer addition, max, min, max pooling, and even multiplication. An operator unit coupled adjacent to the shared memory provides an advantage of integrating software-managed addressing of shared resources and commutative mathematical operations in a single memory system.

The techniques include a read-modify-write control loop implemented at a control unit of the shared memory to track outstanding operations to ensure atomicity as well as to stall or reorder write traffic as needed to ensure vector values are not accumulated against stale vector values. The read-modify-write control loop also provides a performance and energy improvement over inefficient alternative approaches that require reading vector data stored at a first processor core, performing arithmetic operations on the read vector values at a compute unit that is remote relative to the first core, and then doing a store/write back out to the first processor core. In cases where a system has a large vector memory these inefficient alternative approaches may require moving data a significant distance across the chip. Such approaches result in needless consumption of compute cycles in the processor core and bandwidth on the wires to and from the core. These inefficiencies also produce a deeper computation schedule and needlessly consume register bandwidth.

The techniques include an accumulate-to-memory feature that is based in part on an accumulate flag generated at a processor core and used in conjunction with the DMA paths of the shared memory. The feature allows two or more processor cores to accumulate vectors directly in a shared memory location in the shared memory system. The feature can be particularly useful in a multi-node system by allowing DMAs from multiple cores to target the same memory sectors and addresses concurrently without requiring extraneous synchronization or software locking to arbitrate operations among the cores. For example, this can be helpful for configuring shared memory cells as an all-reduce buffer across multiple chips or a distributed system of processor cores.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
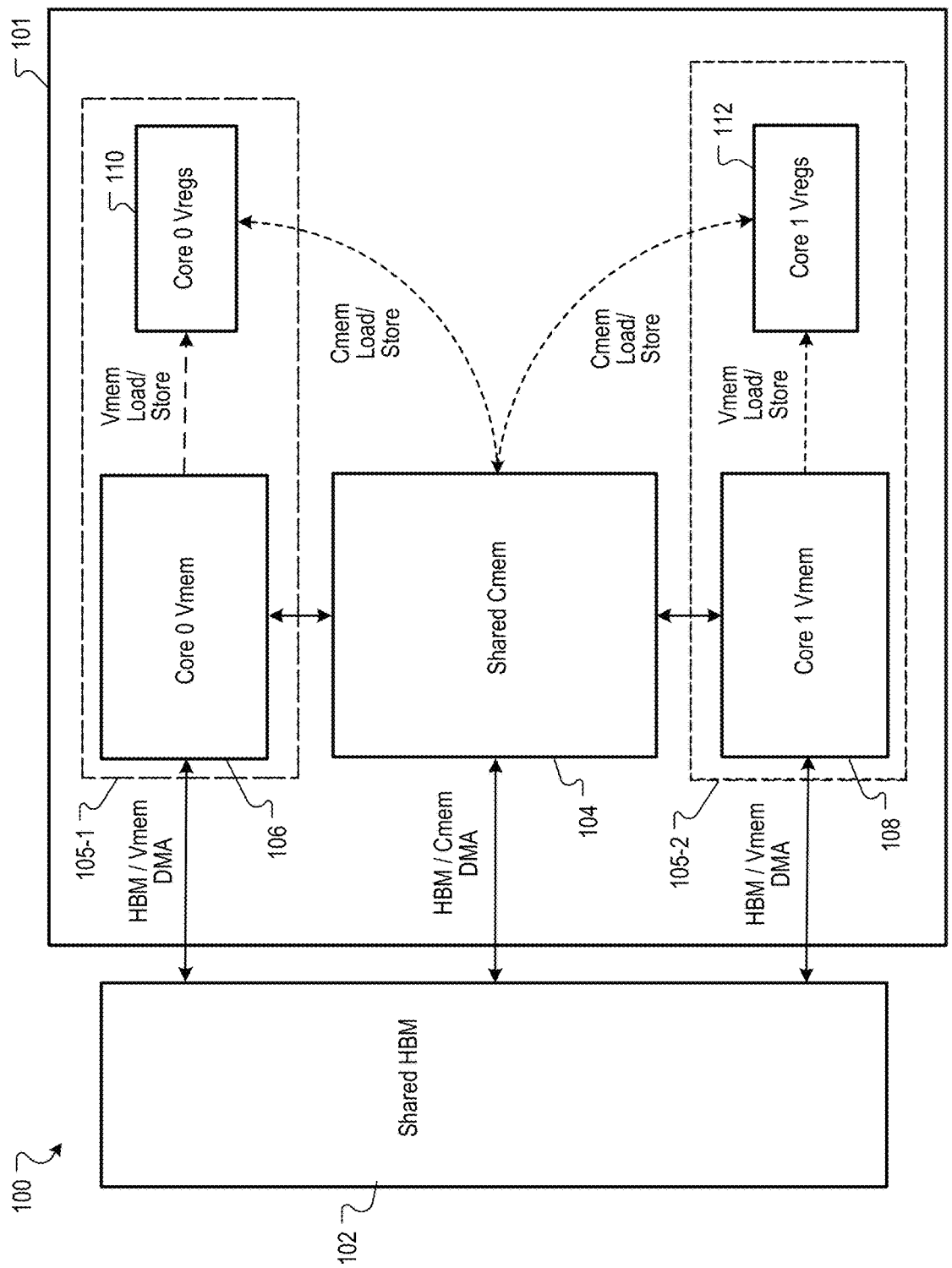
FIG. 1 is a block diagram of a computing system with a hardware circuit that includes an example shared memory.

Reduction operations are commonly used during computations that leverage linear algebra such as compute intensive workloads for operations involving artificial neural networks. For example, a reduction operation may be needed to average gradient values that are computed across different processing nodes of a distributed system during training of a neural network. Reduction operations can occur in a distributed manner, such as for an all-reduce operation, or locally for a given computation, such as a matrix multiply tile summation operation.

Performance and power concerns can be important factors for efficient building and execution of these operations at a compute system. Typically reduction operations require pulling data through a memory hierarchy of a system (e.g., a distributed system) into arithmetic logic units (ALUs) of a processor (or processor core), performing the math/reduction on the pulled data, and then writing the result back out through the memory system. However, implementing these various steps in a system is expensive in both performance and power. Additionally, in a memory that is visible to multiple processor cores, performing reduction operations across cores typically requires synchronization and/or reserving resources in non-overlapping memory regions which can add significant performance and capacity overheads as well as programming complexity.

Based on the preceding context, this specification describes data processing techniques for performing vector reductions by accumulating vectors of values at one or more memory address locations in a large shared scratchpad memory. The vector reductions and accumulations are performed at the shared scratch pad memory based on software managed addressing of memory locations that are used to write (store) results of computes, rather than addressing schemes typically used for hardware managed cached memory systems. The shared memory includes resources such as memory cells that are shared across a distributed system of processor cores. The described techniques include an accumulate-to-memory function for implementing an accumulate reduction step (e.g., for vector reductions) when processing vectors of values. For example, the accumulate reduction step can be implemented across matrix multiplications performed on different sets of inputs that are processed through a layer of a neural network to generate an output for the layer.

The data processing techniques, including the shared scratchpad memory, are implemented using an architecture of a hardware circuit that is improved relative to prior designs. The hardware circuit can be a special-purpose processor, such as a neural network processor, an application specific integrated circuit (ASIC), or a hardware accelerator. The hardware circuit is configured to implement a neural network that includes multiple neural network layers. The improved architecture and data processing techniques described in this document allow circuits that represent hardware accelerators to realize increases in speed and bandwidth for better acceleration of computations.

The computations can be specific types of mathematical operations, such as floating-point multiplication, floating-point addition, or integer addition operation. The computations may also be included among operations of an example neural network model that are performed to compute an inference or to train the model. In some examples, the computations are used to process inputs through layers of a CNN or RNN to generate outputs corresponding to a neural network inference or used to compute gradients with respect to the parameters of the CNN or RNN to update the parameters of the neural network during training.

The mathematical operations are governed by a commutative property and can involve atomic reductions (e.g., atomic floating-point reductions). The atomic reductions are processed as accumulate or vector reduction steps where vectors of values are accumulated directly into a memory location of the shared memory without the need to synchronize activity between the cores that provide the vectors requiring accumulation. In other words, two or more cores of a hardware circuit can accumulate values into a central address location of a shared memory cell in any arbitrary order such that a final result vector provides a correct mathematical result of the accumulation.

FIG. 1 is a block diagram of a computing system 100 that includes an example hardware circuit 101. As noted above, the hardware circuit 101 can represent a hardware accelerator or some other special-purpose processor. In some cases, the system 100 is an example computing system for accelerating tensor or neural network computations associated with artificial deep neural networks (DNNs), such as RNNs or CNNs. For instance, system 100 is configured to implement a CNN on an example hardware accelerator and pass data values to the hardware accelerator to generate outputs for computing an inference.

In some implementations, system 100 is a system-on-chip. For example, the system-on-chip can include hardware circuit 101 and some (or all) of the other components and devices that are described in this document as being included in system 100.

The hardware circuit 101 may be a hardware accelerator configured to accelerate execution and/or performance of a neural network model. For example, execution of the neural network model may be accelerated relative to execution of the model on an example general-purpose machine, such as a central processing unit (CPU). Similarly, performance and execution of the neural network model may be accelerated relative to implementation of the model on another hardware accelerator, such as a graphics processing unit (GPU), which does not have the improved hardware features and techniques described in this specification.

The system 100, including the circuit 101, includes a system memory 102 and a shared memory 104. The system memory 102 can represent a high-bandwidth memory ("HBM 102") or an input/output (I/O) device that exchanges data communications with a processor core 105-1, 105-2, of the hardware circuit 101. The data communications can generally include writing data values to a vector memory 106, 108 located in a particular processor core 105-1, 105-2 or reading data from the vector memory 106, 108 of the particular processor core. For example, the HBM 102 may exchange data communications with processor core 105-1 to pass inputs to the core and to receive outputs generated by one or more computing resources of the core.

The data values can represent vector elements or arrays of vector values. For example, a first vector array can represent a batch of inputs to be processed through a neural network layer, whereas a second vector array can represent a set of weights for the layer. Relatedly, a third vector array can represent a vector of accumulated values that correspond to an output generated at processor core 105-1, whereas a fourth vector array can represent a vector of activation values that represent an output generated at processor core 105-2.

HBM 102 can be dynamic random access memory (DRAM) assets of system 100. In some implementations, HBM 102 is an external or off-chip memory relative to circuit 101 and is configured to exchange data communications with on-chip vector memory banks (described below) of system 100. For example, HBM 102 can be placed at a physical location that is outside of an integrated circuit die that represents circuit 101. Hence, HBM 102 can be distant or non-local relative to computing resources located within the integrated circuit die. Alternatively, HBM 102, or portions of its resources, can be disposed within the integrated circuit die representing circuit 101 such that the HBM 102 is local to or co-located with computing resources of the circuit.

The system 100 can include one or more processor cores 105-1, 105-2. In some implementations, the system 100 includes multiple processor cores 105-$n$, where n is an integer greater than or equal to one. In the example of FIG. 1, as well as FIG. 2 and FIG. 3 described below, system 100 is shown as including two processor cores; however system 100, including the hardware circuit 101 described herein, may have more or fewer processor cores. In general, a processor core 105-n is a discrete, self-contained processing/computing unit of the system 100 (or hardware circuit 101).

Each processor core 105 is configured to independently execute computations (e.g., neural network computations) required by one or more layers of a multi-layer neural network. The computations may be required to process data for a machine-learning workload or to execute specific tasks of the workload. Computations performed at a processor core to process inputs through one or more neural network layers may include a multiplication of a first set of data values (e.g., inputs or activations) with a second set of data values (e.g., weights). For example, the computation can include multiplying an input or activation value with a weight value on one or more cycles and performing an accumulation of products over many cycles.

The different values in the first and second sets of data values are stored at specific memory locations of a memory construct in a processor core of the hardware circuit 101. In some implementations, individual values in the first set of data values may correspond to respective elements of an input tensor, whereas individual values in the second set of data values may correspond to respective elements of a weight (or parameter) tensor. As an example, a neural network layer in a sequence of layers can process a set of inputs, such as inputs of image pixel data or activation values generated by another neural network layer in the sequence of layers.

The set of inputs or set of activation values can be represented as a one dimensional (1D) or multi-dimensional tensor (e.g., 2D or 3D) with multiple elements along its respective dimensions. Each of the memory locations that store a data value can be mapped to a corresponding element of a single or multi-dimensional tensor and the tensor elements may be traversed or accessed using control logic of the circuit. For example, the control logic can determine or compute a memory address value mapped to an element to load or store the corresponding data value of the element.

The hardware circuit 101 has a specialized memory hierarchy that includes different memory constructs. Each of these memory constructs have varying bandwidth and latency properties relative to other constructs and may also vary in their physical placement within the hardware circuit 101. Example memory constructs include the shared memory 104, vector memory 106, 108, and vector register 110, 112. In general, the memory constructs are operable to store data values, such as vector values pertaining to inputs, activations, or gain values, to be processed at a neural network layer, and output activations generated by a neural network layer in response to processing inputs or activations through the layer. The generating and storing of output activations as well as the various memory constructs used to perform these operations are described in more detail below with reference to FIG. 2 and FIG. 3.

Figure 2:
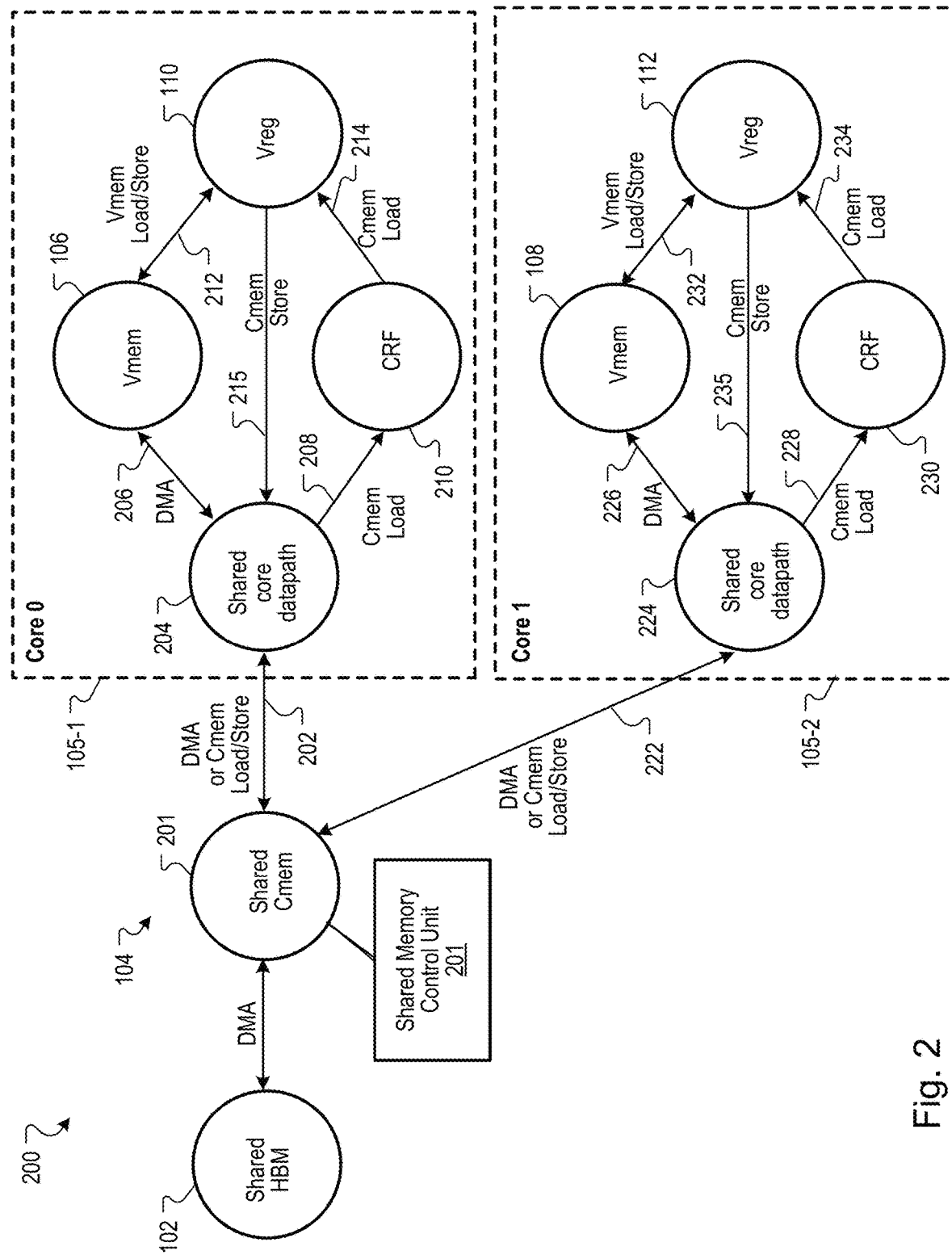
FIG. 2 is a block diagram showing an example of processor cores that communicate with a shared memory of a hardware circuit.

FIG. 2 is a block diagram 200 that shows examples of how resources or sections of shared memory 104 are arranged at hardware circuit 101 to facilitate data communications between various components of the hardware circuit. As indicated above, the shared memory 104 provides a basis for the improved hardware architecture and data processing techniques of system 100. The shared memory 104 is a larger on-chip SRAM relative to on-chip memory of some other neural network processor chips. In some implementations, the shared memory 104 may be described as being between (e.g., logically or physically between) HBM 102 and a respective vector memory 106, 108 of a corresponding processor core 105-1, 105-2. For example, an operation that leverages shared memory 104 to move data between HBM 102 and vector memory 106, 108 would involve the data traversing a shared resource of shared memory 104.

The shared memory 104 can represent a shared central space on the chip or circuit 101. For example, shared memory 104 is configured to function as a shared-global memory space that includes memory resources corresponding to memory banks and registers that are shared between one or more processor cores 105-1, 105-2, among multiple processor cores that may be present in system 100 and/or included at hardware circuit 101. As described in more detail below, the shared memory 104 is configured to function as a software-controlled scratchpad (e.g., similar to an example vector). In some implementations, some (or all) of the resources of shared memory 104 are configured to function as a software-controlled scratchpad (staging resource) rather than a hardware managed cache.

The system 100 is configured to expose at least two programming interfaces to a user for leveraging the data transfer functions afforded by shared memory 104. A first interface exposes programmable DMA data transfer functions and operations, whereas a second, different interface exposes programmable load/store data transfer functions and operations. Each of these interface functions can represent logical attributes of shared memory 104 that are described in more detail below.

As noted above, memory constructs of system 100 have varying bandwidth and latency properties. For example, the shared memory 104 may have higher bandwidth and lower latency than DRAM accesses of HBM 102, but lower bandwidth and higher latency than accesses to vector memory 106, 108. In some examples, shared memory 104 has a lower data capacity than DRAM assets of the HBM 102, but a higher data capacity than the respective vector memories of the processor cores. In general, these varying bandwidth and latency properties are representative of standard memory hierarchy tradeoffs.

Memory constructs of system 100, particularly shared memory 104, may also vary in their physical placement within hardware circuit 101. The shared memory 104 includes resources such as memory banks and registers that may be physically and logically arranged with respect to the placement of certain computational resources of the processor cores 105-1, 105-2. In this context, the shared memory 104 may be characterized generally with reference to its physical structure and its logical structure. The physical structure of shared memory 104 will be discussed initially, whereas its logical structure is described below.

Regarding its physical structure, the resources of shared memory 104 may be physically distributed on a special-purpose or neural net processor chip corresponding to hardware circuit 101. For example, different subsets, portions, or sections of resources that form the shared memory 104 may be physically distributed at various locations of the circuit 101 to enable different types of data transfer operations and processing techniques to be implemented at system 100. In some implementations, one section of resources of shared memory 104 can reside inside a processor core of the circuit 101, whereas another section of resources can reside outside of a processor core of the circuit 101. In the example of FIG. 2, a section of shared memory 104 is external to each of the processor cores 105-1, 105-2 to enable DMA operations that move large blocks of data between memory locations of HBM 102 and memory locations of shared memory 104.

Referring briefly again to HBM 102, this type of system memory can be an external memory structure used by system 100 to provide and/or exchange high bandwidth data with the vector memories of the respective processor cores. In some implementations, HBM 102 is configured for a variety of direct memory access (DMA) operations to obtain data from, or provide data to, memory address locations of the vector memory in processor cores of circuit 101. More specifically, DMA operations that involve HBM 102 exchanging data with the vector memories 106, 108 are enabled by an example control scheme and memory resources of shared memory 104.

Figure 3:
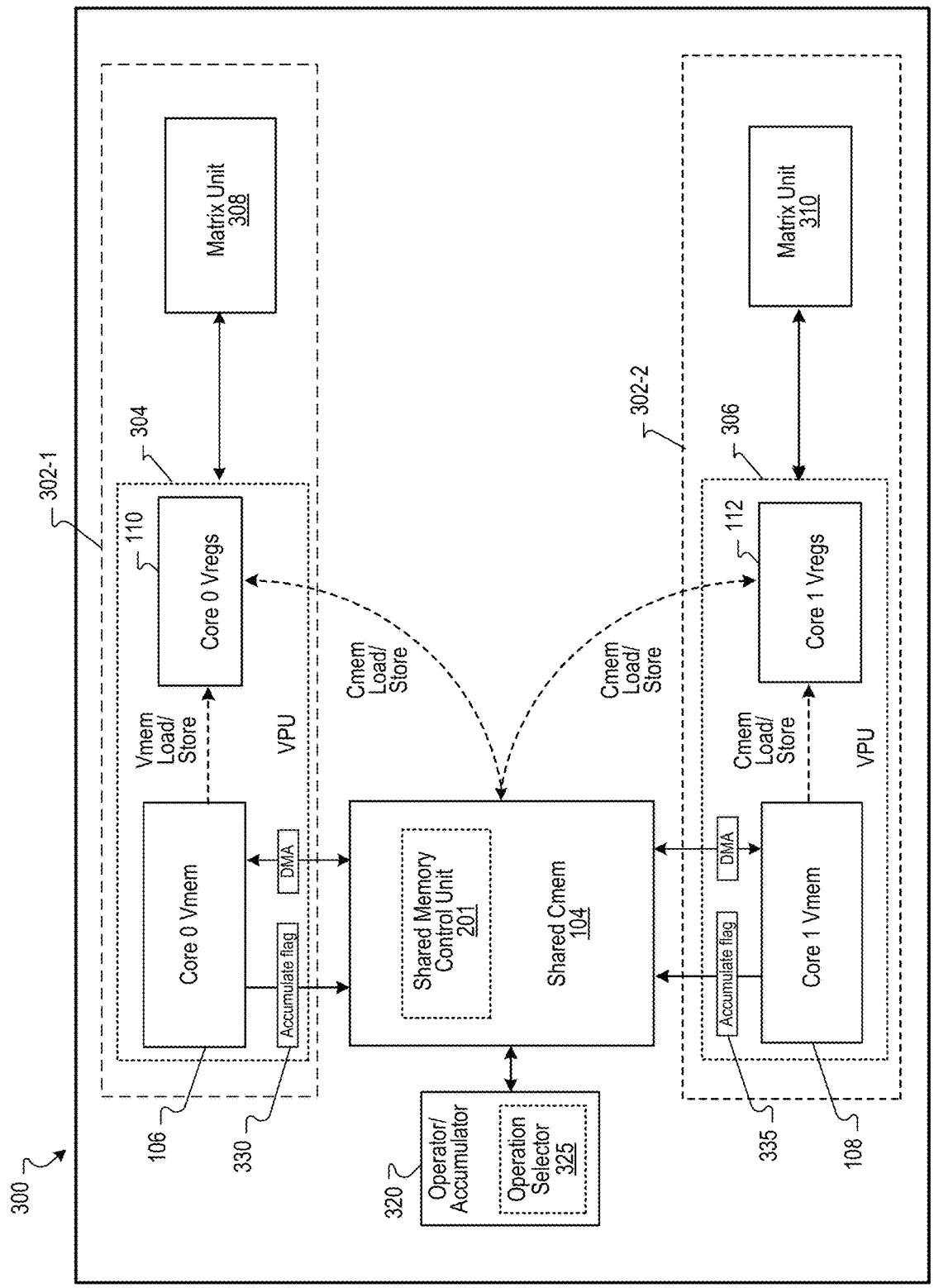
FIG. 3 is a block diagram showing an example of vector processors that communicate with a matrix computation unit of a hardware circuit.

In the examples of FIG. 2, and FIG. 3 (described below), the shared memory 104 includes a shared memory control unit 201 ("control unit 201"). The control unit 201 is configured to generate control signals 114 for controlling memory access operations involving each of the HBM 102, shared memory 104, the vector memory 106, 108, and vector register 110, 112.

The control unit 201 implements a control scheme that is distributed across the different memories of system 100 (e.g., HBM 102, shared memory 104, vector memory 106, 108, and vector register 110, 112). In some implementations, this control scheme is distributed across the different memories based on communication between the control unit 201 and a respective control unit of each memory. For example, the control scheme can be distributed across the memories based on control signals provided by the control unit 201 that are processed locally by the respective control units of these different memories. The sharing of data paths can be used to move data between the HBM 102 and the respective vector memory of the processor cores 105-1, 105-2. When this occurs, the system 100 causes any (and all) required control units for a given memory or data path to be activated to manage data hand-offs that need to occur at the appropriate touch points.

The control unit 201 is configured to execute software instructions and generate control signals that cause a first portion of the memory resources of the shared memory 104 to function as a DMA memory unit. The first portion of resources can be represented by shared core data path 204 with reference to processor core 105-1 and shared core data path 224 with reference to processor core 105-2. This representative DMA memory unit is operable to move data between the HBM 102 and each of the first processor core 105-1 and the second processor core 105-2 based on control signals generated by the control unit 201.

For example, the control signals can be generated to execute a DMA operation to move blocks of data (e.g., a vector) between: a) memory locations of shared memory 104 and vector memory 106 using data path 202, shared core data path 204, or data path 206 and b) memory locations of shared memory 104 and vector memory 108 using data path 222, shared core data path 224, or data path 226. In some implementations, the shared memory 104 may be referred to alternatively as shared CMEM 104.

As used in this document, CMEM generally corresponds to blocks of physically contiguous memory (CMEM) that provide useful configurations as data buffers and on-chip SRAM storage. As described in more detail below, in system 100, blocks of CMEM resources are physically distributed at hardware circuit 101 and arranged for sharing between components of processor cores that may be configured as a hardware accelerator or other type of special-purpose processor. Each of the shared core data path 204 and 224 are example nodes that can indicate a static contention that may occur on the shared data paths for movement of vector data crossing these points in the system.

As shown in the example of FIG. 2, the hardware circuit 101 and system 100 is configured to include multiple load-store data paths 202, 206, multiple CMEM load data paths 208, 214, 228, 234, and multiple CMEM store data paths 215, 235. The hardware circuit 101 and system 100 also includes multiple shared staging blocks 210, 230 (described below). In the example of FIG. 2, each of data paths 202, 222, can be configured as a data path for routing data (e.g., vectors or scalar values) in response to executing a DMA operation, a data path for routing data in response to executing a CMEM load/store operation, or both. The DMA operations and data paths 202, 206, 222, and 226 that are supported by the shared memory 104 can be used to move data between different memory structures with reference to certain memory offsets and stride parameters.

For example, the system 100 is configured to use the shared memory 104 to execute a DMA operation that involves moving 1 megabyte of data from one set of memory locations to another set of memory locations and with offset 0x04. The shared memory 104 and system 100 are operable to support various stride functions when executing the DMA operations. For example, the DMA operation for moving 1 megabyte of data can include a stride operation to insert address spacing at every 200 kilobytes relative to the address base.

In some implementations, the stride operation is used to insert the address spacing based on a desired read sequence that will be later executed to read the 1 megabyte of data after the data is moved to its destination locations. For example, the 1 megabyte block of data may be stored based on a stride operation that corresponds to how data will be read or retrieved for processing at different layers of a neural network or across different sets of filters or weights for a particular neural network layer.

The control unit 201 of shared memory 104 is also configured to cause performance of various load-store operations. For example, the control unit 201 generates control signals to execute load-store operations that move various quantities of data (e.g., vectors or vector values) between: a) memory locations of shared memory 104 and memory locations of the shared staging block 210 using data path 202, shared core data path 204, or data path 208 (for a load operation at core 105-1) and b) memory locations of shared memory 104 and memory locations of the shared staging block 230 using data path 222, shared core data path 224, or data path 228 (for load operation at core 105-2).

Similarly, the control signals can be generated to execute load-store operations that move various quantities of data (e.g., vectors or vector values) between: a) memory locations of shared memory 104 and vector register 110 using data path 202, shared core data path 204, or data path 215 (for a store operation at core 105-1) and b) memory locations of shared memory 104 and vector register 112 using data path 222, shared core data path 224, or data path 235 (for store operation at core 105-2).

Referring now to the logical structure of shared memory 104, as noted above, the system 100 is configured to expose at least two programming interfaces to a user for leveraging the data transfer functions afforded by shared memory 104. At least one interface exposes programmable DMA functions and another interface exposes programmable CMEM load/store functions, where each can represent logical attributes of shared memory 104. For load/store purposes, the shared memory 104 is logically exposed as a parallel memory to vector memory 106, 108. In this manner, each load-store data path is operable to provide an additional (or parallel) data path for moving blocks of data or a particular piece of data through the memory systems, such as through the vector registers, of respective processor cores 105-1, 105-2, or multiple cores of circuit 101. For example, load-store operations may be executed against the memory resources of shared memory 104 concurrent with DMA operations.

More specifically, a DMA operation may be executed to move a vector of values between memory locations of shared memory 104 and vector memory 106 using the DMA data path 206, while a load-store operation is executed, concurrent with the DMA operation, to move a different vector of values between memory locations of shared memory 104 and shared staging block 210. Similar concurrent operations may occur in processor core 105-2 (or other cores) using the resources of processor core 105-2 that correspond to the resources of processor core 105-1.

Load/store operations that are performed using the CMEM resources of shared memory 104 can represent high performance functions of the shared memory 104, or a high performance methods of using shared memory 104, relative to DMA operations. In some implementations, the control unit 201 is configured to execute software instructions and generate control signals that cause a second portion of the memory resources of the shared memory 104 to function as a software-controlled staging resource that is used to perform the load/store operations.

The second portion of resources can be represented by shared staging block 210 with reference to processor core 105-1 and shared staging block 230 with reference to processor core 105-2. Hence, each of shared staging block 210, 230 can represent a software-controlled staging resource (or scratchpad) that is formed from a subset of memory resources of the shared memory 104. In some examples, the software-controlled staging resource of system 100 is configured to manage the flow of vector data values from the HBM 102 to the respective vector registers 110 or 112 of the first processor core 105-1 or the second processor core 105-2.

The shared memory 104 and its resources have a property of being uniquely configurable as a DMA memory, e.g., for moving data between memory constructs such as HBM 102 or vector memory 106, 108, but also a load/store memory for moving data directly into the respective vector registers 110, 112 on each processor core 105-1, 105-2. These configurable aspects of shared memory 104 allow its resources and addressing to be scheduled at fine granularity by software running on the core. For example, shared memory 104 can be a software managed (not hardware managed) SRAM resource, in which a compiler of a processor core manages the addressing of its memory specifically, including the types of data that may or may not be present at the memory address locations of shared memory 104.

In some implementations, the software-controlled staging resources of shared memory 104 are configured to as a first-in-first-out (FIFO) memory structure (e.g., shared staging block 210 or 230) along a load section of the load-store data path of processor core that includes CMEM store data path 215 or 235 for routing data for storage at shared CMEM 203 or HBM 102. The FIFO memory structure is configured to temporarily store a set of data values for a threshold number of processor cycles before routing the set of values to the respective vector register 110, 112 of the first processor core 105-1 or the second processor core 105-2. The FIFO memory structure is used to mitigate register pressure and scheduling complexity that might result from a CMEM load operation that has a particular load latency.

In some implementations, the threshold number of clock cycles is determined based on an example high latency (e.g., 50 cycles) CMEM load operation that is likely to cause register pressure and scheduling complexity associated with reserving a given register for the entire 50 cycles. To counteract or mitigate the concerns regarding register pressure, a CMEM Result FIFO ("CRF") is physically instanced at the hardware circuit 100 using resources of shared memory 104. In the example of FIG. 2, a first CRF is represented by staging block 210 of processor core 105-1, whereas a second CRF is represented by staging block 230. Each of the CRFs allow an example CMEM load operation to be broken into at least two phases: i) the CMEM to CRF phase, where the CMEM address information is provided, and ii) the CRF to register phase, where the vector register target is provided.

For example, each of shared staging block 210, 230, are configured to receive data values (e.g., scalar or vector values) and temporarily store the data values for a threshold number of processor cycles. In processor core 105-1, the data values are routed to shared staging block 210 along the load data path 208 (and shared core data path 204) that connects the staging block 210 to other memory locations of shared memory 104. In processor core 105-2, the data values are routed to shared staging block 230 along the load data path 228 (and shared core data path 224) that connects the staging block 230 to other memory locations of shared memory 104.

The shared staging block 210 is configured to provide the data values to the vector register 110 of the processor core 105-1 in response to temporarily storing the data values for the threshold number of processor cycles. Likewise, the shared staging block 230 is configured to provide the data values to the vector register 112 of the processor core 105-2 in response to temporarily storing the data values for the threshold number of processor cycles.

System 100 is configured to issue multiple CMEM load instructions on the same cycle. For example, system 100 can issue a CMEM load instructions that is performed using data path 208 (or 214) and shared staging block 210 and, on the same cycle, issue a load to vector memory 106 that is performed using the data path 212. In some examples, from the viewpoint of the software controls, a Cmem load operation that traverses the data path 214 between the resource 210 and the vector register 110 and a Vmem load operation that traverses the data path 212 between vector memory 106 and the vector register 110 can each issue and execute on the same cycle. In some implementations, the vector registers 110, 112 are adapted, relative to a prior design, to include additional ports that allow the vector registers 110, 112 to receive concurrent load operations.

For example, vector register 112 is configured to include additional ports that allow the register to receive respective vector payloads from vector memory 108 and shared staging block 230 during concurrent load operations that are executed at processor core 105-2. In some examples, a single piece of data for a payload that is loaded to each of vector registers 110, 112 involves 128 discrete loads based on the up to 128 data items that may be moved to vector register 110 or vector register 112 during a single load operation.

The CMEM load/store functionality of shared memory 104 can provide higher peak performance relative to prior designs, since it does not require routing data through vector memory macros. For example, the loads and stores (along data path 215, 235) can be executed in parallel to vector memory loads and stores due, in part, to the additional available register ports at the vector registers 110, 112.

In some implementations, system 100 includes an example load-store interface that provides a parallel interface into each of shard staging blocks 210, 230 that bypasses some (or all) of the bandwidth restrictions that may exist when traversing data paths through vector memory 106, 108. This example load-store interface can effectively provide for higher memory bandwidth that allows for extracting additional performance from an example work load. For example, system 100 is configured to perform various load/store operations using resources of shared memory 104 (e.g., the software-controlled staging resource), where the load/store operations may be performed to bypass moving data through the vector memory at a processor core.

For example, a component of hardware circuit 101 can communicate with shared memory 104 to read data from a single address location of a memory bank or register file of shared memory 104. In some examples, the data stored at a single address in the memory is read and that single piece of data may be moved into a register file or staging block located inside a processor core. For example, a single piece of data may be read from an address location of shared CMEM 104, moved through shared core data path 224, and moved into an address location of shared staging block 230 in processor core 105-2 for further processing. The operation may be performed to bypass moving the data through the memory system via vector memory 108, thereby conserving processor clock cycles at core 105-2 and bandwidth at data paths that connect to vector memory 108.

FIG. 3 is a block diagram 300 that shows examples of vector processors that communicate with a matrix computation unit of hardware circuit 101. More specifically, in some implementations, a tensor processor core 302-1 of hardware circuit 101 includes a vector processing unit 304 ("vector processor 304") and a matrix computation unit 308 that is coupled to the vector processor 304. Similarly, another tensor processor core 302-2 of hardware circuit 101 includes a vector processor 306 and a matrix computation unit 308 that is coupled to the vector processor 306.

In general, the hardware circuit 101 is configured to perform computations to generate an output for a neural network layer. Each of the matrix computation units 308 and 310 included at the circuit 101 are configured to perform a subset of the computations to generate accumulated values that are used to generate the output for the neural network layer. In some implementations, the software-controlled staging resource (e.g., staging blocks 210, 230) described above is configured to manage the flow of data, such as vector operands, from the HBM 102 to each of matrix computation units 308, 310. In some cases, the operands are inputs and weights provided by HBM 102. The operands may be structured as vector arrays based on data operations performed using Arithmetic Logic Units (ALUs) of the vector processors 304 or 306.

In the example of FIG. 3, the control unit 201 generates control signals for managing operations to retrieve (or read) multiple batches of inputs and sets of weights from memory locations of shared memory 104, vector memory 106, 108, and vector register 110, 112. The retrieved inputs and weights may be processed through a neural network layer to generate accumulated values based on computations performed at the matrix computation unit 308, 310. The accumulated values may be processed at the vector processors 304, 306 to generate activation values that correspond to an output for the neural network layer.

The control signals generated by the control unit 201 are used to store (or write) multiple sets of outputs or output activations generated by the vector processors 304, 306 to HBM 102 or other memory locations of hardware circuit 101 for processing at one or more other neural network layers. More specifically, system 100 is configured to implement data processing techniques for performing vector reductions that include accumulating vectors of values at one or more memory address locations in a large shared scratchpad memory such as shared memory 104. As noted above, the vector reductions and accumulations can be performed at the shared scratch pad memory 104 based on software managed addressing of locations in memory cells of the shared memory 104. The address locations in memory cells of the shared memory 104 can be used to write (store) results of computes that occur at different components of system 100.

The system 100 includes an operator/accumulator unit 320 ("operator 320") that is (or can be) coupled to the shared memory 104. The operator 320 is configured to accumulate values based on one or more arithmetic operations. The arithmetic operations can be programmed or encoded at the operator 320 in software, firmware, hardware, or a combination of each. The operator 230 can represent a compact portion of compute logic that is coupled close to the memory cells of shared memory 104 to perform an accumulate operation on vector values being routed to a shared memory cell of the shared memory 104.

In some implementations, the operator 320 is a computational unit that includes hardware circuitry for implementing different types of adders (e.g., a normalized adder) and multipliers that are each configured to perform different types of mathematical operations on values that have different types of numerical formats. For example, the operator 320 is configured to perform mathematical operations such as: floating-point multiplication; floating-point addition; integer addition operation; and min-max operations. In some other implementations, the operator 320 is included at system 100 as a hardware feature of the shared memory 104. One or more arithmetic operations or functions of the operator 320 may also be implemented in software as well as hardware.

The operator 230 can include logic 325 for selecting a particular arithmetic operation or for selecting circuitry at the operator 230 configured to perform a particular arithmetic operation. In some implementations, the operator 320 is instantiated at the shared memory 104 and/or hardware circuit 101 based on one or more numerical formats (e.g., two's complement integers and floating-points) of the values in the vector of values. For example, a numerical format corresponds to a data format that is used to represent numbers or numerical values of the vectors. In some implementations, the operator 320 includes circuitry for a normalization unit, a pooling unit, or both.

As noted above, the described techniques include an accumulate-to-memory function for implementing an accumulate reduction step (e.g., for vector reductions) when processing vectors of values. In the example of FIG. 3, each of processor cores 302-1, 302-2 can generate a respective accumulate flag 330, 335 to cause the control unit 201 of shared memory 104 to perform an accumulate-to-memory function on an example vector of values. The vector of values can be moved to the shared memory 104 using a DMA operation that moves the vector to the shared memory 104 using, for example, data path 206 or data path 226.

Figure 4:
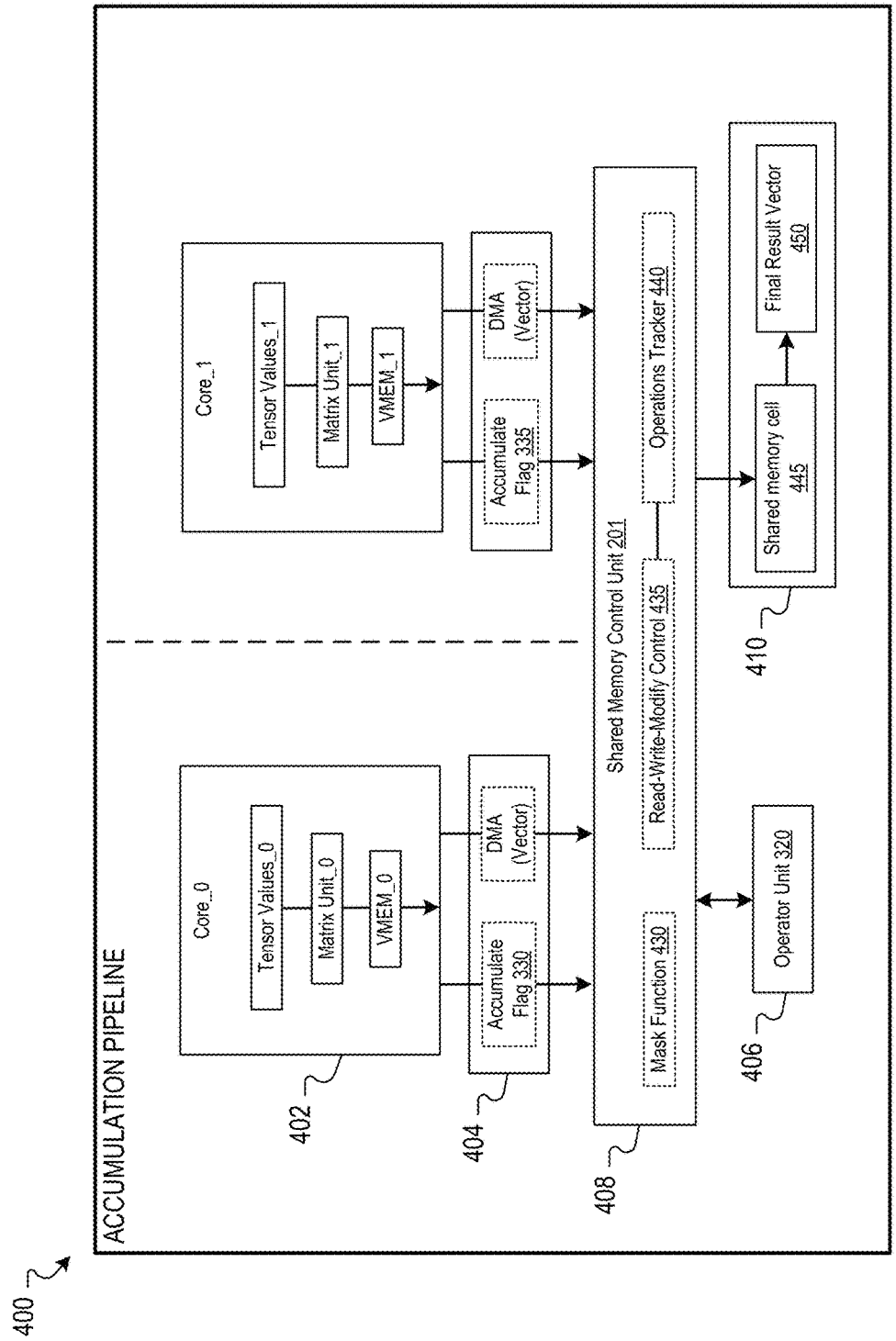
FIG. 4 is a block diagram showing an example accumulation pipeline.

FIG. 4 is a block diagram showing an example accumulation pipeline 400 ("pipeline 400"). The pipeline 400 shows example data processing steps for an example operation to accumulate vector of values in a shared memory cell 445 of shared memory 104.

Vector operands such as individual inputs and weight values may be represented as tensor values that are multiplied using a multiplication cell of an example matrix unit of a processor core and then stored in a vector memory of the core (402). In some implementations, the inputs of the vector operands correspond to partitions of an input matrix or input tensor. For example, an input tensor may be split into two sections and input values from different respective dimensions of each section may be sent to a particular processor core for multiplying with a weight value to generate output values. Input tensors along with weight tensors and output tensors are described in more detail below with reference to FIG. 5.

A final result vector 450 can be based on a final set of output values that represent an output computed for a layer of a neural network using each of the inputs of the input matrix/tensor. So, even though the data/input values of the input tensor may be split up for processing at different processor cores, generating a correct and accurate final result vector 450 actually depends on the correct and accurate accumulation of at least two different sets of output values that are generated by the respective cores. For example, different sets of output values generated by the respective cores need to be summed or accumulated together to generate the correct final result vector 450.

In the example of FIG. 4 the respective processor cores are indicated as core_0 (e.g., processor core 302-1) and core_1 (e.g., processor core 302-2). Multiple output values may be generated in response to matrix multiplies that are performed by the respective matrix unit (e.g., matrix 308 or 310) of each processor core. In some implementations, the output values are stored in a vector memory of the processor core that performs the matrix multiplication before being sent to the shared memory 104 for an accumulation operation.

In some cases, the final result vector 450 is obtained based on both processor cores aggregating their respective half of the compute they were assigned. Prior approaches to accumulating vector values required one core to move its results to another core. These approaches required additional processor cycles, memory resources, compute bandwidth, and specific software controls to move different sets of result values between the different cores of a system. The accumulate reduction techniques of this specification enable these aggregations to occur in the shared memory system based on accumulation functions that can performed natively in the shared memory 104.

Each of processor core can generate a respective accumulate flag 330, 335 to cause the control unit 201 of shared memory 104 to perform an accumulate-to-memory function on an example vector of values (404). The vector of values generated at each processor core 105 can be moved to the shared memory 104 using a DMA operation as described above. The techniques for accumulating vectors of values at a shared memory cell or address location of shared scratchpad memory 104 can be executed via a programmable DMA data transfer function of system 100. For example, any DMA operation that is operable to move data into a memory cell of shared memory 104 can use the accumulation techniques described in this document. In this manner, each of core 0 and core 1 in the examples of FIG. 2 and FIG. 3 can both accumulate vector values into the same address location for a certain shared memory cell of the shared memory 104.

In some implementations, system 100 is configured to provide a large vector "store accumulate" in a load/store usage mode of the shared memory 104, rather than usage of the DMA mode of the shared memory. For example, a shared load/store memory layer between multiple processor cores can be used to implement "store accumulate" functions, which decouples need for some (or all) synchronization between processor cores. In some implementations, the shared load/store memory layer between multiple processor cores used to implement the store accumulate functions include at least data paths 212, 232 described above with reference to FIG. 2.

The shared memory 104 and control unit 201 use the operator 320 to perform accumulation operations on the respective vectors of values (406). For example, the control unit 201 implements the accumulate reduction step across matrix multiplications performed on different sets of inputs that are processed through a layer of a neural network to generate an output for the layer. In some implementations, the vector of values can be respective vectors of accumulated values that are generated as a result of the matrix multiplies described above.

The control unit 201 is configured to mask one or more vector elements to enable or disable accumulation in certain vector elements, execute controls to manage accumulation of different vectors, and track outstanding accumulate operations (408).

With respect to masking elements, the system 100 can include machines such as computing servers or associated hardware circuits that each include a 16 B (16-bit) wide vector unit (e.g., a vector processor). The vector unit can be configured to operate on data elements that are 16 bits wide, but the vector of values generated by a resource of the hardware circuit (or server) may be only 9 B wide vector. In some implementations, the system 100 operates on one or more 9-element wide vectors, each of which includes nine data values that are each 16-bits. In this instance, the control unit 201 can identify the data structure of a vector of values to be accumulated in a shared memory location of shared memory 104. Based on the data structure, the control unit 201 can determine that the value to be accumulated in the shared location is a 9 B wide vector relative to the 16 B wide vector configuration of the vector unit.

The control unit 201 can execute a mask function 430 that causes the operator 230 to apply the arithmetic operation only to, for example, the first nine fields in the vector when performing the accumulation or reduction. For example, a request to the shared memory 104 from the processor core 302-1 to accumulate a vector into shared memory cell 445 may be presented as a 16 B wide vector based on a configuration of a vector processing unit 304 of the processor core 302-1. The control unit 201 is configured to determine that the value being accumulated is represented by a second half of the 16 B wide vector or a 9 B wide vector represented by the first nine fields of the 16B wide vector. Hence, the system 100 is operable to identify and select, or otherwise control, which specific elements in a vector will be accumulated into the shared memory cell 445.

With respect to accumulate controls, the control unit 201 is configured to execute a read-modify-write control 435 ("control 435") to control and manage accumulation of different vectors of values in the shared memory system. The control 435 provides a performance and energy improvement over inefficient alternative approaches that require reading data at a first core, performing the math on the read value at a compute unit that is remote relative to the first core, and then doing a store/write back out to the first core.

With respect to tracking outstanding operations, the control unit 201 is configured to execute an operations tracker 440 to keep track of outstanding requests and current (or queued) operations for accumulating different vectors of values in the shared memory system. For example, the control unit 201 uses the operations tracker 440 to track each write operation that requests to write a vector of values to a memory location of shared memory, such as shared memory cell 445. In some implementations, the control unit 201 tracks the operations based on the accumulate flag 330, 335 that accompanies a write request from a processor core. The accumulate flag 330, 335 indicates that the vector of values is to be written as an initial value, or accumulated with an existing value, at a particular memory location of the shared memory 104.

The control unit 201 transmits control signals to the operator 320 to cause the operator 320 to perform an accumulate operation between the current value stored at the particular memory address location and the vector of values being written to that shared memory location. In some implementations, a request from a processor core to write a vector of values to shared memory cell 445 requires at least two clock cycles to process. Because processing the write request can require at least two clock cycles, a read/write hazard can occur if the control unit 201 attempts to read a value at the shared memory location when another vector is being written at the same shared memory location. In this case, the value being read is not the most recent value because the write operation was not fully processed before performing reading the value.

The control unit 201 uses the operations tracker 440 to determine which requests were sent to the shared memory 104 in the last few clock cycles and determines whether the value stored at a particular memory location is stale or fresh. The control unit 201 can determine whether the value is stale or fresh based on a time stamp of the last write request or based on a time required (e.g., two or more clock cycles) to process the last write request. For example, the time stamp can indicate that more than two clock cycles have passed since the last request was initiated or processed at the shared memory 104. If the value is determined to be fresh, then the control unit 201 will read the value. If the value is determined to be stale, then the control unit 201 will stall reading the value until a required number of clock cycles have passed to indicate that the value is once again fresh for reading or for accumulating against.

System 100 is configured to receive a value (e.g., a vector) and accumulate it into an existing value in shared memory location 445, without losing previous accumulations stored in the shared memory location (410). For example, the system 100 is configured to implement the accumulate operations without requiring extraneous software locks to mitigate race conditions that can overwrite vector accumulates previously stored at a memory location such as shared memory cell 445. The system 100 implements the accumulate operations without requiring that local pre-accumulate operations be performed at the respective processor cores and without requiring any pre-synchronization between the processor cores.

The shared memory 104 is configured to natively support this function, which represents an atomic aspect of the vector reduction features of this technique. For example, multiple cores (e.g., 10 cores) in system 100 may all be generating different vectors of values and each core can submit a request to accumulate their respective vectors at a shared memory location. In some implementations, the request includes an accumulate flag 330, 335 and a corresponding core ID (e.g., core 0, core 1, core N, etc.), and the value to be accumulated into the memory location. In some implementations, a large matrix multiply job may be split among at least two processor cores of system 100 and this accumulate/vector reduction technique is used to streamline accumulation of the partial sums or dot products that are generated from the matrix multiplies.

In some implementations, these techniques for accumulating vectors of values at a shared memory cell are used during training of a neural network model. For example, the techniques can be used to implement an all-reduce operation for gradient accumulation which reduces gradients that are calculated as part of the training step across a distributed system of processor cores. In particular, based on the disclosed accumulate reduction techniques, this gradient accumulation for training a neural network model can be implemented at system 100 natively as a function of the memory system or shared memory 104.

Figure 5:
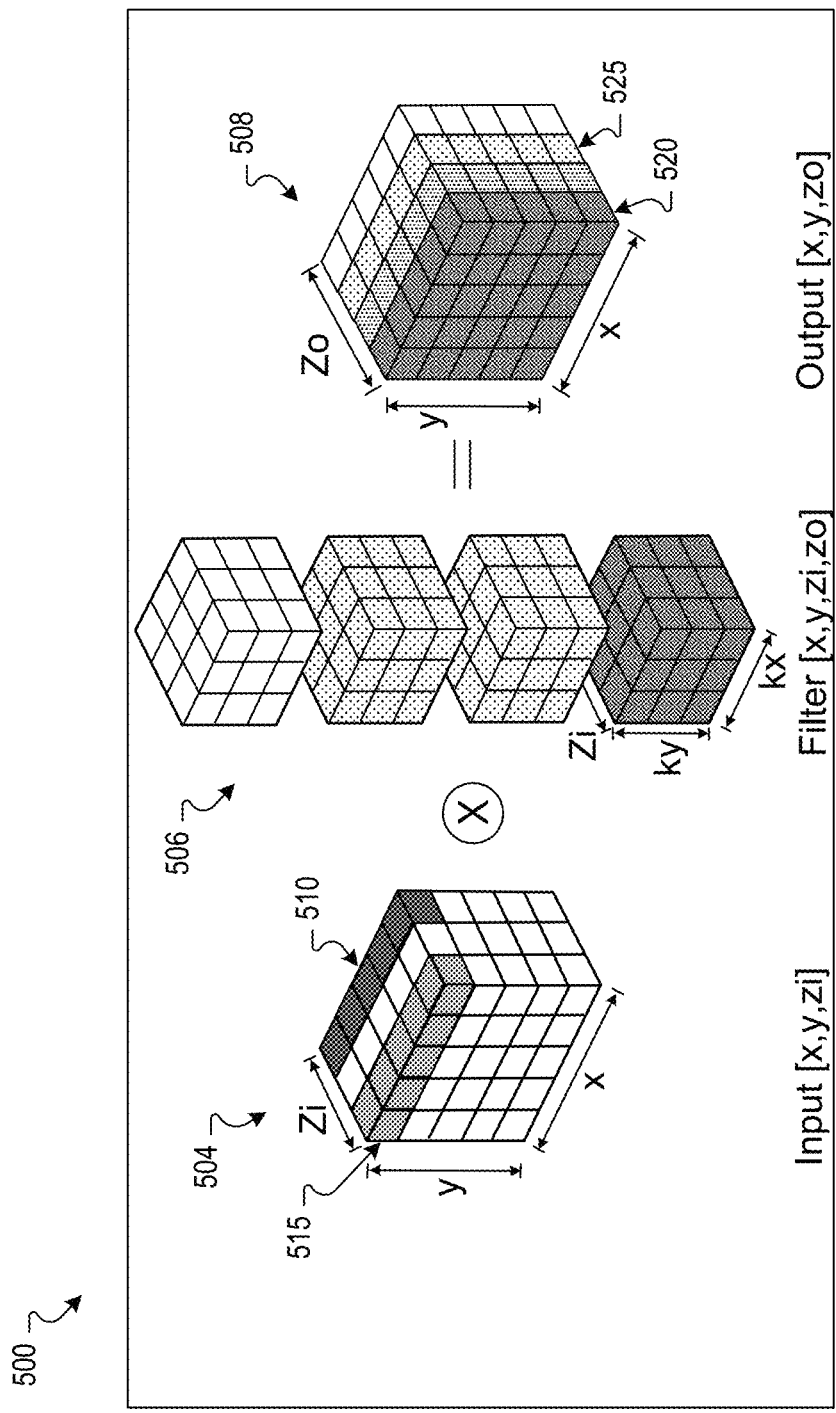
FIG. 5 illustrates examples of input tensor, a weight tensor, and an output tensor.

FIG. 5 illustrates examples of tensors or multi-dimensional matrices 500 that include an input tensor 504, variations of a weight tensor 506, and an output tensor 508. In FIG. 5, each of the tensors 500 include elements that correspond to data values for computations performed at a given layer of a neural network. The computations can include multiplication of an input/activation tensor 504 with a parameter/weight tensor 506 on one or more clock cycles to produce outputs or output values. Each output value in a set of outputs corresponds to a respective element of output tensor 508. Multiplying an activation tensor 504 with a weight tensor 506 includes multiplying an activation from an element of tensor 504 with a weight from an element of tensor 506 to produce a partial sum(s).

In some implementations, the processor cores of system 100 operate on vectors that correspond to: i) a discrete element in some multi-dimensional tensor; ii) a vector of values that include multiple discrete elements along the same or different dimensions of some multi-dimensional tensor; or iii) a combination of each. The discrete element, or each of the multiple discrete elements, in some multi-dimensional tensor can be represented using X,Y coordinates (2D) or using X,Y,Z coordinates (3D) depending on the dimensionality of the tensor.

The system 100 can compute multiple partial sums that correspond to products generated from multiplying a batch inputs with corresponding weight values. As noted above, the system 100 can perform an accumulation of products (e.g., partial sums) over many clock cycles. For example, the accumulation of products can be performed in the shared memory 104 based on the techniques described in this document. In some implementations, an input-weight multiplication may be written as a sum-of-product of each weight element multiplied with discrete inputs of an input volume, such as a row or slice of the input tensor 504. This row or slice can represent a given dimension, such as a first dimension 510 of the input tensor 504 or a second, different dimension 515 of the input tensor 504.

In some implementations, an example set of computations can be used to compute an output for a convolutional neural network layer. The computations for the CNN layer can involve performing a 2D spatial convolution between a 3D input tensor 504 and at least one 3D filter (weight tensor 506). For example, convolving one 3D filter 506 over the 3D input tensor 504 can produce a 2D spatial plane 520 or 525. The computations can involve computing sums of dot products for a particular dimension of the input volume.

For example, the spatial plane 520 can include output values for sums of products computed from inputs along dimension 510, whereas the spatial plane 525 can include output values for sums of products computed from inputs along dimension 515. The computations to generate the sums of the products for the output values in each of spatial planes 520 and 525 can be performed in the shared memory 104 (e.g., at shared memory cell 445) using the accumulate reduction steps described in this document.

Figure 6:
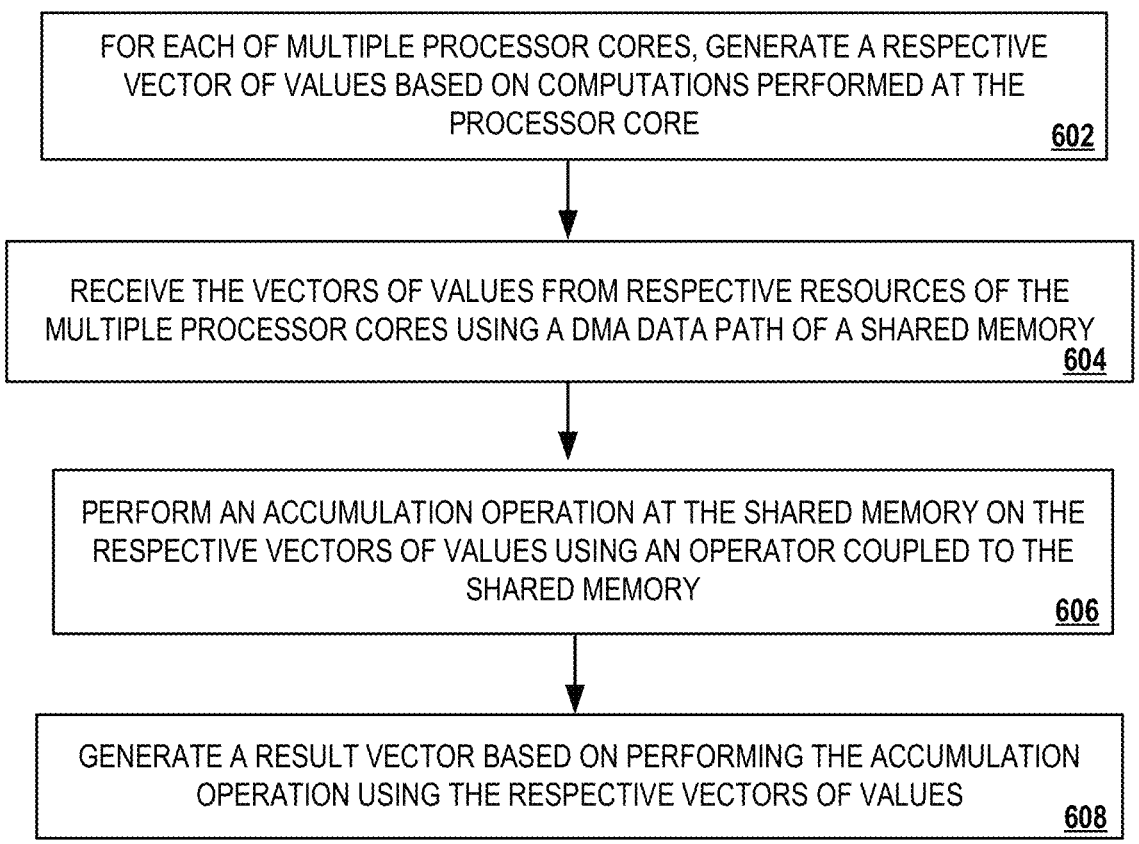
FIG. 6 is a flow diagram that illustrates an example process for performing vector reductions using the shared memory of FIG. 1.

FIG. 6 is a flow diagram that illustrates an example process 600 for performing vector reductions using a shared scratchpad memory of a hardware circuit having processor cores that communicate with the shared memory. In some implementations, process 600 is part of a technique used to accelerate neural network computations using the shared memory of FIG. 1.

Process 600 can be implemented or executed using the system 100 described above. Descriptions of process 600 may reference the above-mentioned computing resources of system 100. The steps or actions of process 600 may be enabled by programmed firmware, or software instructions, that are executable by one or more processors of the devices and resources described in this document. In some implementations, the steps of process 600 correspond to a method for performing computations to generate an output for a neural network layer using a hardware circuit configured to implement the neural network.

Referring now to process 600, vectors of values are generated at system 100 (602). For example, a respective vector of values is generated for each of the processor cores that are included at one or more hardware circuits of system 100 based on computations that are performed at the processor core.

A shared memory of system 100 receives the respective vectors of values (604). For example, the shared memory 104 receives the vectors of values from respective resources of the processor cores using a direct memory access (DMA) data path of the shared memory 104. In some implementations, a vector or vector of values is generated by a single processor core (or each of multiple processor cores) and then provided to a shared memory of system 100 that performs computations using the vector of values. For example, the shared memory can obtain a vector from a first processor core and perform a reduction operation using the obtained vector, and one or more other vectors. The one or more other vectors may have been received or obtained from processor cores other than the first processor core.

In some other implementations, the system 100 is configured to implement a direct store operation with an accumulate operation. For example, the system 100 can generate an accumulate flag 330, 335 that is used to directly store one or more vector of values in a shared memory location of the shared memory 104. The vectors can be from a single processor core or from multiple different processor cores. For example, the processor core 105-1 or 302-2 can generate a control signal that represents an accumulate flag and pass the control signal to the control unit 201 of the shared memory 104. The system 100 can be configured to store a vector of values in the vector memory 106, 108 and then perform a DMA operation to move the vector of values from the vector memory to the shared memory 104.

The system 100 performs an accumulation operation on the respective vectors of values (606). More specifically, the shared memory 104 performs an accumulate operation when the respective vectors of values are written to the shared memory location. For example, the system 100 causes the shared memory 104 to perform an accumulation operation on the respective vectors of values using an operator 320 coupled to the shared memory 104. The operator 320 is configured to accumulate values based on arithmetic operations encoded at the operator unit. In some implementations, the arithmetic operations are mathematical operations governed by a commutative property. The arithmetic operations can involve atomic reductions (e.g., atomic floating-point reductions).

For example, the atomic reductions are processed as accumulate or vector reduction steps in which vectors of values are accumulated directly into a memory location, such as a shared cell, of the shared memory. In one example, the system 100 accumulates multiple vectors generated from multiple different cores together as part of an accumulate operation. In another example, the system 100 accumulates a value (e.g., a vector) that is already stored in the shared memory 104, such as in a shared cell of the memory, with a value produced by a core. In another example, the system 100 accumulates multiple vectors generated from multiple different cores with one or more values already stored in the shared memory 104. The preceding examples involving vectors generated at a core and values already stored in the shared memory can also apply to reductions operations as well as other types of arithmetic operations that can be implemented using the operator 320.

In some other implementations, each of processor cores 302-1, 302-2 provide vectors that require accumulation and the values are accumulated directly into the memory location without synchronizing activity between processor cores 302-1, 302-2. Similarly, the values can be accumulated directly into the memory location without either of processor cores 302-1, 302-2 having to perform a step of pre-accumulating products, e.g., partial sums, which can result from computations performed at either of the processor cores. In other words, two or more cores of system 100 can accumulate vectors of values, including partial sums, into an address location (e.g., a central address location) of a shared memory cell of memory 104 in any arbitrary order.

The system 100 generates a result vector (e.g., a final result vector) based on performing the accumulation operation using the one or more vectors of values (608). The result vector still provides a correct mathematical result of the accumulation even though the respective vectors that are accumulated to produce the final result arrive in the shared memory cell in any arbitrary order. The result vector can be a final result vector that represents a set of outputs for a neural network layer. For example, the neural network layer can be convolutional neural network layer and the outputs can be a set of activation values that are generated in response to convolving each kernel (e.g., parameter/weight of tensor 506) across a particular input volume of input tensor 504.

The system 100 can generate a vector of accumulated values as a result of performing the accumulation operation on the respective vectors of values. In some implementations, the respective vector of values are partial sums that correspond to dot products. For example, referring again to a convolutional neural network layer, the inputs of the input volume mentioned above are processed by performing dot product operations using: i) each input value along a given dimension (e.g., dimension 510) of the input tensor 504 and ii) a set of parameters for the convolutional layer. Corresponding sets of dot products or partial sums can be accumulated at a memory location of shared memory 104 to generate a set of accumulated values in response to convolving at least one kernel of the weight tensor 506 with a portion of inputs along the given dimension of the input volume.

The system 100 can apply an activation function to each value in the vector of accumulated values. For example, a layer of a neural network may (or may not) have an activation function which represents a non-linearity function, such as ReLU, sigmoid, or tan h, that provides non-linearity in a neural network. The system 100 generates the result vector in response to applying the activation function to each value in the vector of accumulated values. In some implementations, the hardware circuit 101 is a hardware accelerator configured to implement a neural network that includes multiple neural network layers and system 100 generates an output for a layer of the neural network based on the result vector. For example, processing a layer input at a neural network layer can involve the layer applying an activation function to generate a set of activation values that are an output of the neural network layer. The activations generated by a first neural network layer can be processed through a second or subsequent layer of the neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed using an integrated circuit for a hardware machine-learning accelerator that includes a plurality of cores and a shared memory that communicates with each of the plurality of cores, the method comprising:

generating, by each of the plurality of cores, a respective vector of values;

performing, across the plurality of cores and into a shared memory cell in the shared memory, a plurality of atomic vector reductions using each of the respective vectors and an operator unit of the shared memory without synchronization; and generating a result vector based on the plurality of atomic vector reductions.

2. The method of claim 1, wherein performing the plurality of atomic vector reductions comprises:

accumulating a first vector stored in the shared memory cell with a respective second vector generated by one or more of the plurality of cores.

3. The method of claim 1, wherein:

each of the plurality of cores comprises a respective vector-processing unit; and generating a respective vector of values comprises:
generating, by each of the vector-processing units, a respective vector of values.

4. The method of claim 3, wherein each of the operator unit and the shared memory is external to the respective vector-processing unit in each of the plurality of cores.

5. An integrated circuit for a hardware machine-learning accelerator, the integrated circuit comprising:

a plurality of cores;

a shared memory that communicates with each of the plurality of cores; and a non-transitory machine-readable storage device for storing instructions that are executable by a processor to cause performance of operations comprising:

generating, by each of the plurality of cores, a respective vector of values;

performing, across the plurality of cores and into a shared memory cell in the shared memory, a plurality of atomic vector reductions using each of the respective vectors and an operator unit of the shared memory without synchronization; and generating a result vector based on the plurality of atomic vector reductions.

6. The integrated circuit of claim 5, wherein performing the plurality of atomic vector reductions comprises:

accumulating a first vector stored in the shared memory cell with a respective second vector generated by one or more of the plurality of cores.

7. The integrated circuit of claim 5, wherein:

each of the plurality of cores comprises a respective vector-processing unit; and generating a respective vector of values comprises: generating, by each of the vector-processing units, a respective vector of values.

8. The integrated circuit of claim 7, wherein each of the operator unit and the shared memory is external to the respective vector-processing unit in each of the plurality of cores.

* * * * *